United States Patent
Suzuki

(10) Patent No.: US 6,712,643 B2
(45) Date of Patent: Mar. 30, 2004

(54) ELECTRONIC EQUIPMENT

(75) Inventor: Shinji Suzuki, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/448,106

(22) Filed: May 30, 2003

(65) Prior Publication Data

US 2004/0033718 A1 Feb. 19, 2004

(30) Foreign Application Priority Data

Aug. 19, 2002 (JP) ........................................ 2002-238115

(51) Int. Cl.[7] ................................................ H01R 3/00
(52) U.S. Cl. ......................... 439/500; 429/100; 429/96
(58) Field of Search .............................. 439/500, 627; 429/98, 99, 100; 320/110

(56) References Cited

U.S. PATENT DOCUMENTS 5,206,098 A * 4/1993 Cho et al. ................... 429/96
5,357,185 A * 10/1994 Chen ........................... 320/110
6,203,363 B1   3/2001 Yanaura
6,511,770 B2 * 1/2003 Chang ......................... 429/100

FOREIGN PATENT DOCUMENTS

JP           11-003691 A       1/1999

* cited by examiner

Primary Examiner—Renee Luebke
Assistant Examiner—Briggitte R. Hammond
(74) Attorney, Agent, or Firm—Sughrue Mion, PLLC

(57) ABSTRACT

An electronic equipment comprises a battery storage section that may store two types of rectangular battery which are mutually different in thickness, and a cover that covers the battery storage section, in which the electronic equipment is operative upon receipt of an electric power from the rectangular battery stored in the battery storage section. The battery storage section has a holding member movable between a holding position in which a thin rectangular battery is held and a save position in which it is permitted that a thick rectangular battery is stored in the battery storage section. The cover has a stopper section that stops the holding member at both times when the holding member is at the holding position and when the holding member is at the save position.

3 Claims, 6 Drawing Sheets

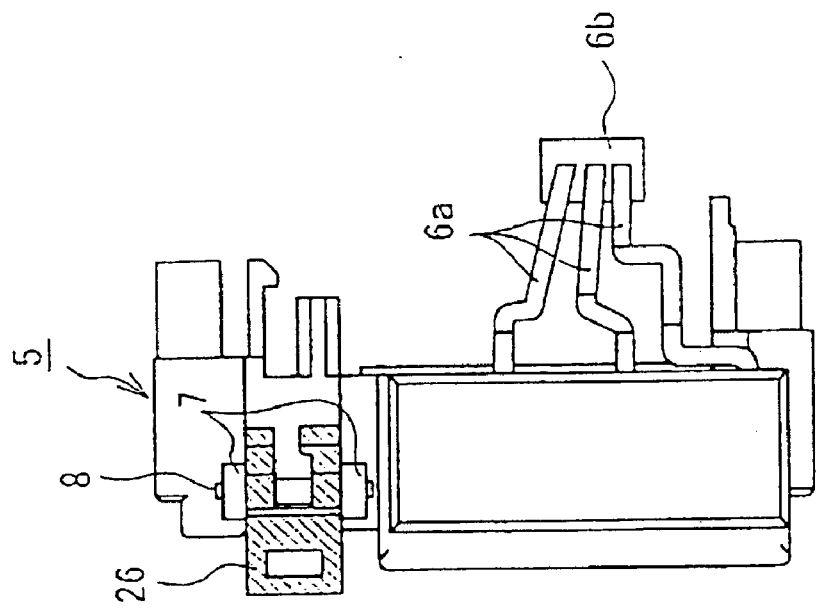
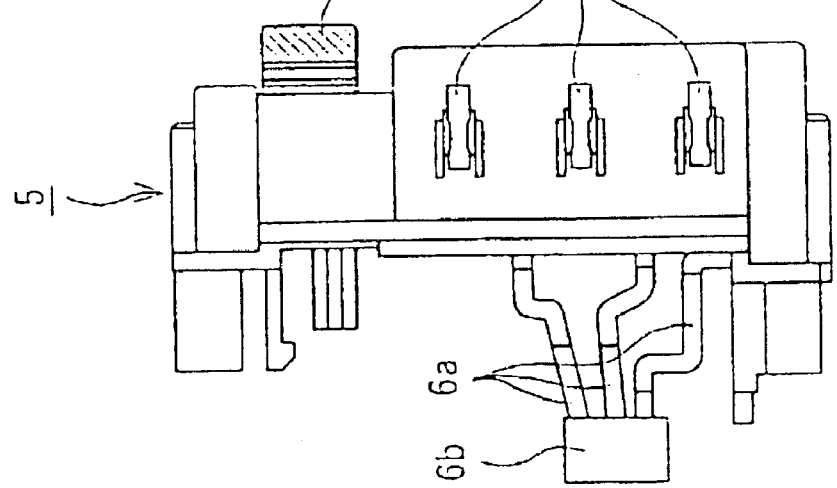
Fig. 4(a)　Fig. 4(b)　Fig. 4(c)

SEC B-B

ELECTRONIC EQUIPMENT

BACKGROUND OF THE INVENTION

1. Field of the Invention

The present invention relates to electronic equipment using a rectangular battery, such as a portable telephone, a digital camera, a video camera, a mobile printer.

2. Description of the Related Art

Hitherto, in electronic equipment, such as a portable telephone, a still camera, a digital camera, and a video camera, there is used a rectangular type of secondary battery, which is repeatedly available by charging. As a way of storing the rectangular type of secondary battery in a storage section of the electronic equipment, there are known, for example, a side-insertion type of one in which a rectangular battery having electrodes is inserted from a side thereof into an aperture of a storage section and is locked with a cover, and a front storage type of one in which a rectangular battery is stored from the front thereof into a frame of a storage section and covers the frame with a cover. Further, in view of the fact that storage of the rectangular battery into equipment enlarges a cover member of the equipment, there is proposed a way in which terminals of the battery are disposed at the outside of the battery. Furthermore, there is proposed a way in which a battery storage case is separated and the battery storage case is coupled with a cover member of equipment when a rectangular battery is used.

However, an arrangement that the battery storage case is coupled with the cover member of the equipment may enlarge the equipment when the rectangular battery is used. This is inconvenient for carrying about. Such an arrangement that the terminals of the battery are disposed at the outside of the battery brings about the exposure of the terminals of the battery at the time of non-use of the rectangular battery. This may spoil of the beauty of the equipment. In view of the foregoing, there is proposed a way that terminals of a battery is movably disposed between the inside and the outside of a cover member of an equipment, so that when a rectangular battery is used, the terminals of a battery is moved outside the cover member so as to be connected with the rectangular battery, and when a rectangular battery is not used, the terminals of the battery is moved inside the cover member so as to be stored in the cover member (cf. Paragraph 0004 to Paragraph 0010, Japanese Patent Application Laid Open Gazette Hei. 11-3691). This makes it possible to use a different capacity of rectangular battery, and to improve the beauty of the equipment and also to contribute to a miniaturizing of the cover member.

However, in electronic equipment which is used through carrying about, such as a camera, an arrangement that a battery is disposed at the exterior enlarges the equipment in its entirety. This brings about problems that easiness of holding and easiness of carrying about are spoiled.

On the other hand, with respect to the rectangular type of battery, two types of rectangular battery, which are same in size but different in thickness, come onto the market. A front storage type of storage section is applicable to any one of those two types of rectangular battery.

However, it would be inconvenient that there are prepared two covers associated with rectangular batteries to be stored and both the covers are carried.

Thus, in order to offer one sort of cover, there are considered a way that dummy parts are prepared in accordance with thickness of the rectangular batteries and the dummy part is interposed between the rectangular battery and the cover, and a way that a lock mechanism, which is manually operable, is prepared, and the lock mechanism is changed over in accordance with thickness of the rectangular batteries. However, in any case, it is necessary for a user to operate each time it happens. Further there is a way that a spring member is mounted inside a cover to absorb a difference between thickness of the rectangular batteries. However, only a provision of the spring member involves a problem that the impact at the time of carrying about may bring about a contact failure of terminals of the battery.

SUMMARY OF THE INVENTION

In view of the foregoing, it is an object of the present invention to provide electronic equipment capable of coping with a storage of two types of rectangular batteries mutually different in thickness with one sort of cover and without user's operation, and involving no problem of a contact failure of terminals of the rectangular battery by the impact at the time of carrying about.

To achieve the above-mentioned objects, the present invention provides an electronic equipment comprising: a battery storage section that may store two types of rectangular battery which are mutually different in thickness; and a cover that covers the battery storage section, in which the electronic equipment is operative upon receipt of an electric power from the rectangular battery stored in the battery storage section, wherein the battery storage section has a holding member movable between a holding position in which a thin rectangular battery is held and a save position in which it is permitted that a thick rectangular battery is stored in the battery storage section, and wherein the cover has a stopper section that stops the holding member at both times when the holding member is at the holding position and when the holding member is at the save position.

According to the electronic equipment according to the present invention as mentioned above, when the thin rectangular battery is stored in the battery storage section, the holding member of the battery storage section and the stopper section holds the rectangular battery. And when the thick rectangular battery is stored in the battery storage section, the holding member of the battery storage section moves to the save position and the cover holds the rectangular battery. Thus, it is possible to cope with two types of rectangular battery by one type of cover, and there is no problem of a contact failure of terminals of the rectangular battery by the impact at the time of carrying about.

In the electronic equipment according to the present invention as mentioned above, it is acceptable that the holding member is pivotally supported between the holding position and the save position, and has an engagement claw and a projection, the engagement claw being engaged with a side edge of the thin rectangular battery stored in the battery storage section when the holding member is at the holding position, and the projection being stopped at the stopper section on a non-rotatable basis at both times when the holding member is at the holding position and when the holding member is at the save position.

According to the electronic equipment according to the present invention as mentioned above, the holding member is pivotally supported between the holding position and the save position, and has the engagement claw and the projection. When the thin rectangular battery stored in the battery storage section, the projection stops at the stopper section of the cover to prohibit the rotation in right and left in a state that the engagement claw stops the rectangular battery. And when the thick rectangular battery stored in the battery storage section, the projection stops at the stopper section of the cover to prohibit the rotation in right and left in a state that the engagement claw does not stop the rectangular battery. And then the cover holds the rectangular battery. Thus, it is possible to cope with two types of rectangular battery by one type of cover, and there is no problem of a contact failure of terminals of the rectangular battery by the impact at the time of carrying about.

In the electronic equipment according to the present invention as mentioned above, it is preferable that an inside of the cover is provided with an elastic member to urge the rectangular battery stored in the battery storage section.

This feature makes it possible to more securely hold the rectangular battery stored in the battery storage section.

BRIEF DESCRIPTION OF THE DRAWINGS

FIG. 4(*a*), FIG. 4(*b*) and FIG. 4(*c*) are a front view, a side view and a rear elevation of the connector member, respectively.

DETAILED DESCRIPTION OF PREFERRED EMBODIMENTS

Embodiments of the present invention will be described with reference to the accompanying drawings.

Figure 1:
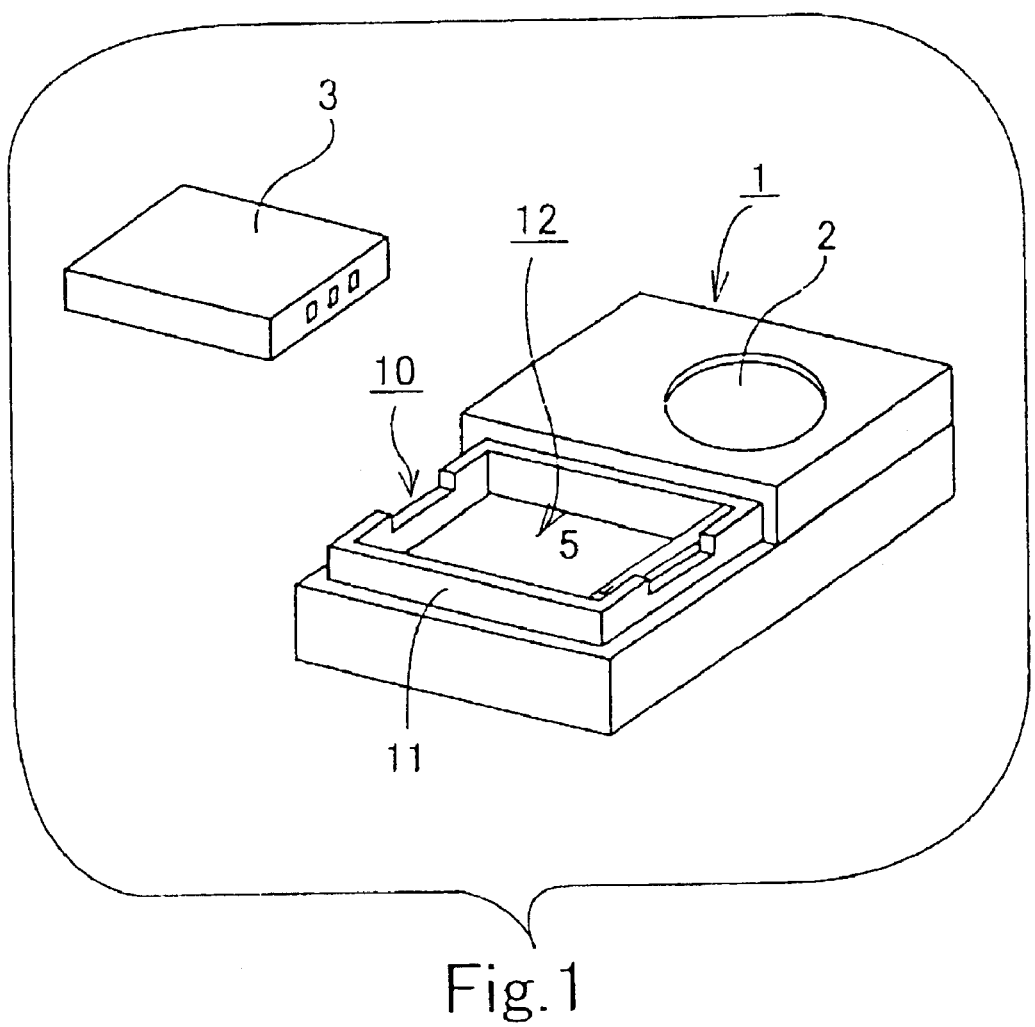
FIG. 1 is a perspective view of a digital camera to which electronic equipment according to an embodiment of the present invention is applied.

FIG. 1 is a perspective view of a digital camera to which electronic equipment according to an embodiment of the present invention is applied.

As shown in FIG. 1, a digital camera 1 is provided with a lens 2 in front of the camera 1, and a battery storage section 10 in an area adjacent to the lens 2. The battery storage section 10 comprises a four-sided frame 11 into which a rectangular battery 3 is stored, a battery storage chamber 12 surrounded by the frame 11, a connector member 5 provided at an edge of the battery storage chamber 12 having a battery terminal to conduct through contacting with an electrode of the rectangular battery 3, and a cover 20 (not illustrated in FIG. 1, cf. FIG. 2) to protect the stored rectangular battery 3 through covering the frame 11.

Figure 2:
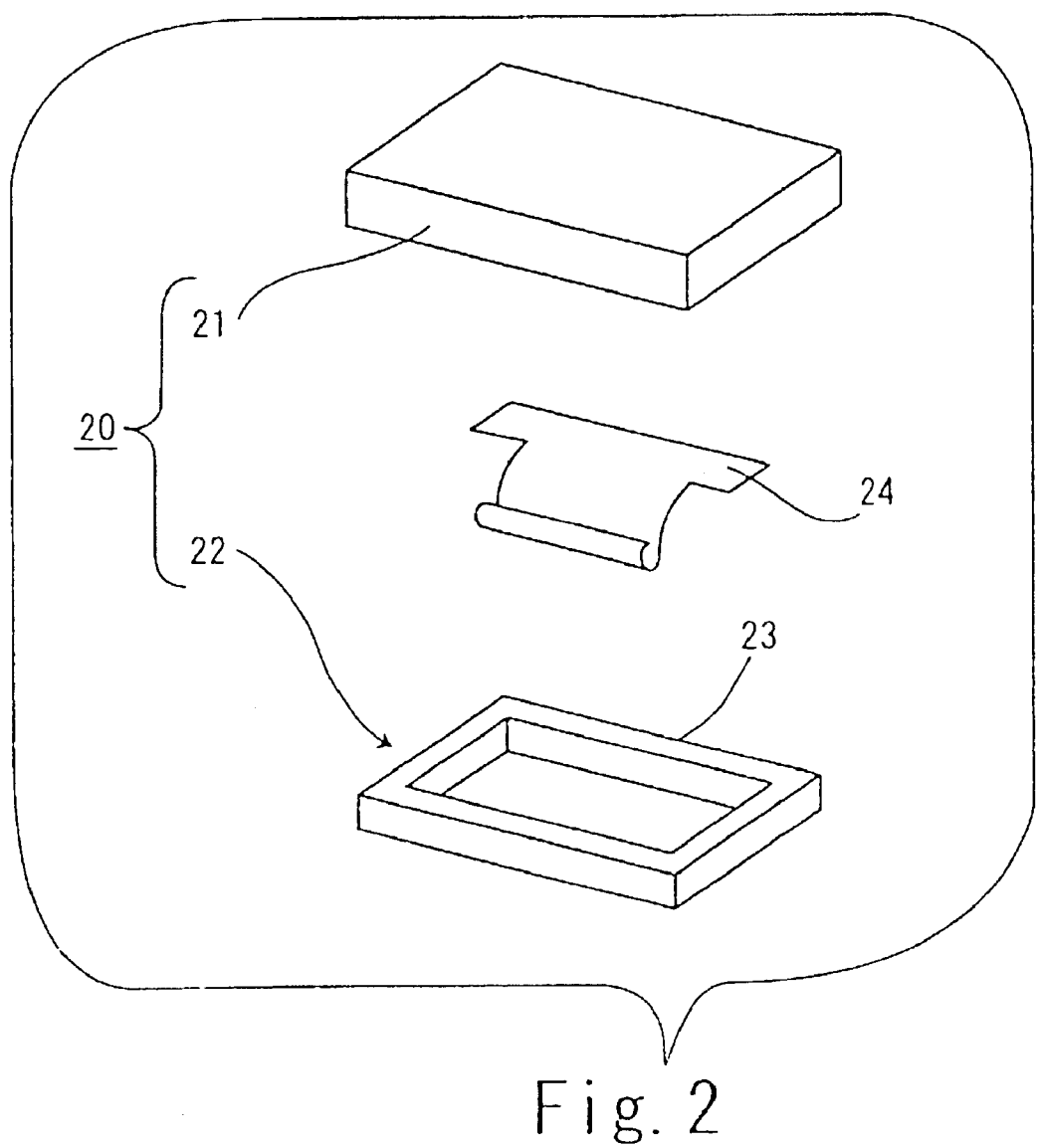
FIG. 2 is a view of a cover to hang over a frame of a battery storage section.

FIG. 2 is a view of a cover to hang over a frame of a battery storage section.

As shown in FIG. 2, the cover 20 comprises an inner panel 22 having an aperture on the top thereof, to cover the frame 11, and an outer panel 21 to cover the inner panel 22. On one side 23 of a four-sided figure in which the outer panel 21 and the inner panel 22 overlap each other, a plate spring member 24 having an enabling force toward the battery storage chamber 12 is fixed on an interposing basis. The plate spring member 24 twists and turns drawing a slow curve from the fixed portion to the side of the battery storage chamber 12 so as to make sure of the enabling force toward the battery storage chamber 12.

Figure 3:
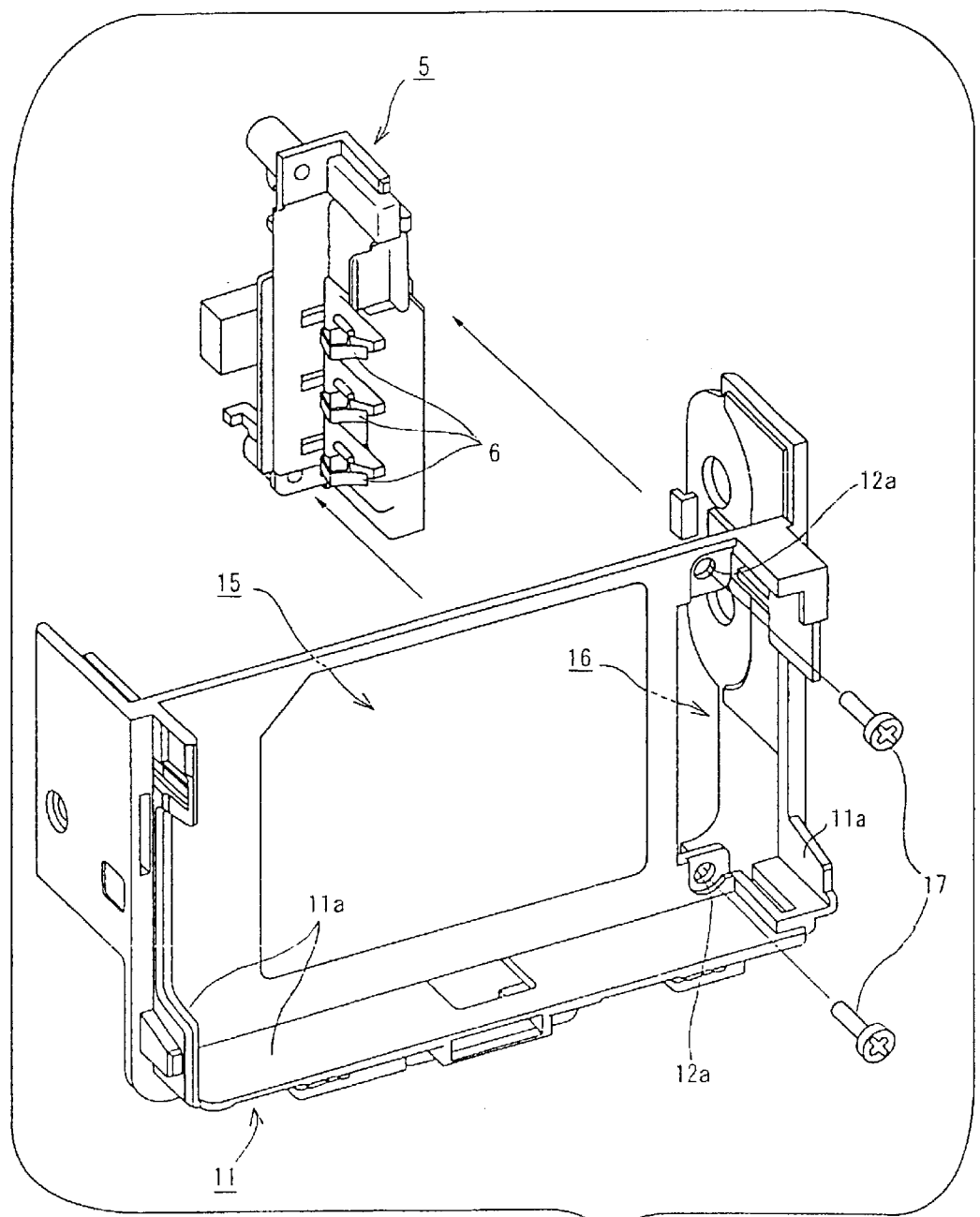
FIG. 3 is a view useful for understanding a relation between a frame and a connector member.

FIG. 3 is a view useful for understanding a relation between a frame and a connector member.

As shown in FIG. 3, the frame 11 is provided with side walls 11*a* on three sides thereof. And the center of the battery storage chamber 12 and one edge are thereof are provided with apertures 15 and 16, respectively. The aperture 16, which is provided on the one edge of the battery storage chamber 12, is engaged with the connector member 5 that is fixed by screws 17 through holes 12*a* provided on the corner of the battery storage chamber 12.

The connector member 5 is provided with battery terminals 6 that contact with electrodes of a rectangular battery to be stored in the battery storage chamber 12.

FIG. 4(*a*), FIG. 4(*b*) and FIG. 4(*c*) are a front view, a side view and a rear elevation of the connector member, respectively.

The connector member 5 has three battery terminals 6 that are connected to harnesses 6*a* connected to a connector 6*b*. When the connector 6*b* is engaged with a connection terminal (not illustrated) of a power supply of a main frame of the digital camera, an electric power of the rectangular battery is supplied to the power supply of the main frame of the digital camera. On the rear of the connector member 5, there are formed projection members 7 projecting at a predetermined interval in parallel to one another each having a penetrating hole at a symmetrical position.

On the other hand, a holding member 26 having a penetrating hole on the side thereof is rotatably fixed on the connector member 5 in such a manner that a pivot 8, which is common to the penetrating holes of the projection members 7, is put through the penetrating holes of the projection members 7, and both edges of the pivot 8 are fixed with the projection members 7.

Figure 5:
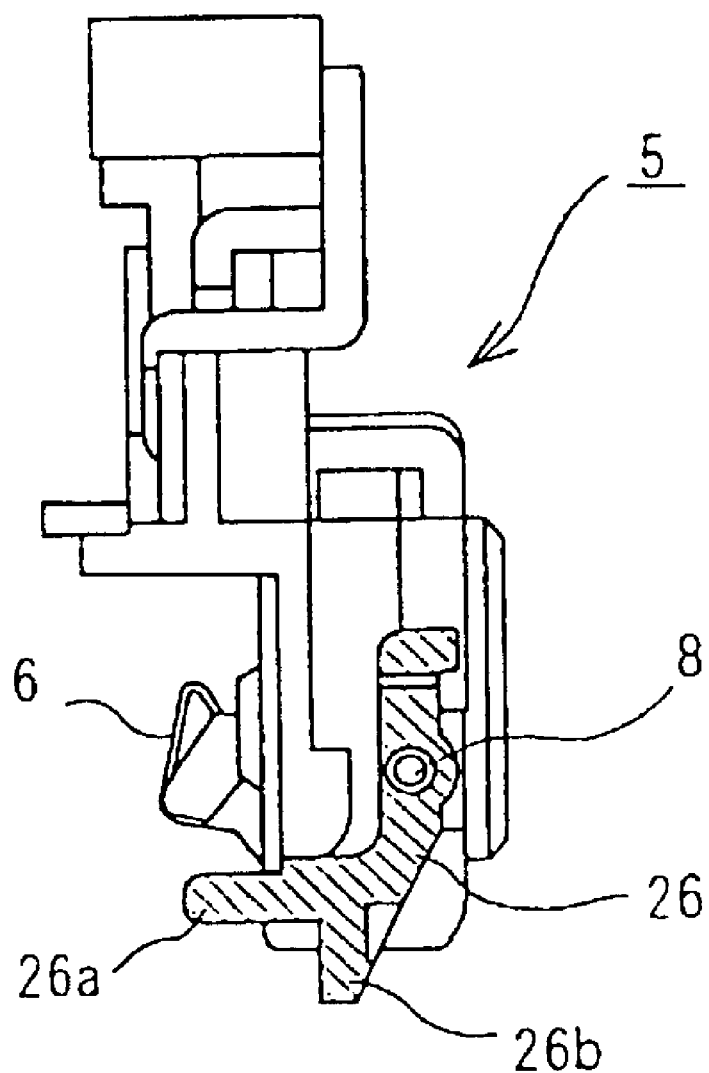
FIG. 5 is a cross-sectional view taken along the line B—B of FIG. 4(*b*).

FIG. 5 is a cross-sectional view taken along the line B—B of FIG. 4(*b*).

As shown in FIG. 5, the holding member 26 is pivotally supported on the connector member 5. The holding member 26 has an engagement claw 26*a* and a projection 26*b*, and moves between a holding position illustrated on the pivot 8 and a save position rotated counterclockwise. The engagement claw 26*a* moves to the holding position when a thin rectangular battery is stored, and stops at the side edge of the rectangular battery. On the other hand, when a thick rectangular battery is stored, the engagement claw 26*a* moves to the save position and bumps against the side of the rectangular battery.

Figure 6:
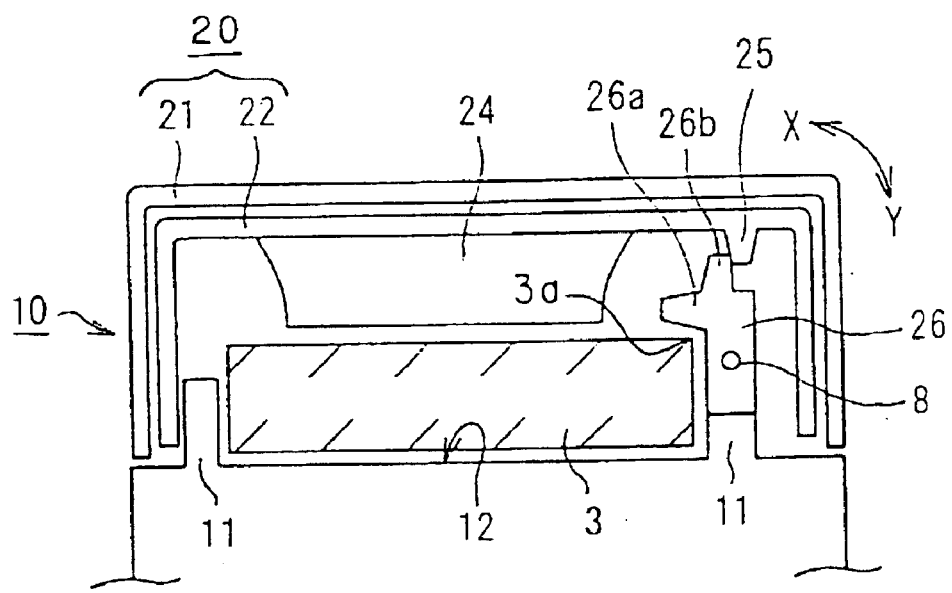
FIG. 6 is a view showing a state that a thin rectangular battery is stored in a battery storage chamber.

FIG. 6 is a view showing a state that a thin rectangular battery is stored in a battery storage chamber.

As shown in FIG. 6, a thin rectangular battery 3 is stored in the battery storage chamber 12, and the cover 20, which is formed by superposition of the inner panel 22 and the outer panel 21, is put thereon, so that the plate spring member 24, which projects from the aperture of the inner panel 22 into the battery storage chamber 12, twists and turns drawing a slow curve in the battery storage chamber 12 to urge the thin rectangular battery 3 with a predetermined enabling force. The engagement claw 26*a* stops at a side edge 3*a* of the side having the electrode of the thin rectangular battery 3, and the projection 26*b* formed in a united body with the engagement claw 26*a* is in a position perpendicular to the engagement claw 26*a*. Thus, a stopper section 25, which is provided at the end of the inside of the inner panel 22, restricts the rotation of the projection 26b in the direction of an arrow Y, and the side edge 3a of the rectangular battery 3 restricts the rotation of the engagement claw 26a in the direction of an arrow X, so that the rectangular battery 3 is prevented in a vertical motion. Further, since the plate spring member 24 urges the rectangular battery 3 with a predetermined pressure, the rectangular battery 3 is more reliably prevented in a vertical motion.

Figure 7:
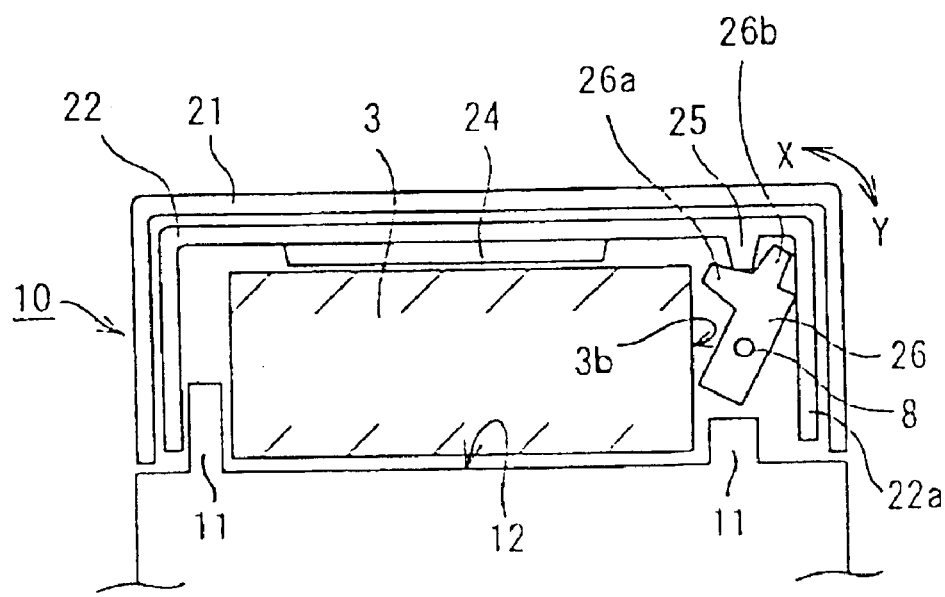
FIG. 7 is a view showing a state that a thick rectangular battery is stored in a battery storage chamber.

FIG. 7 is a view showing a state that a thick rectangular battery is stored in a battery storage chamber.

As shown in FIG. 7, a thick rectangular battery 3 is stored in the battery storage chamber 12, and the cover 20, which is formed by superposition of the inner panel 22 and the outer panel 21, is put thereon, so that the plate spring member 24, which projects from the aperture of the inner panel 22 into the battery storage chamber 12, is urged by the thick rectangular battery 3 stored in the battery storage chamber 12 to go in an aperture between the inner panel 22 and the outer panel 21. The engagement claw 26a bumps against a side 3b of the thick rectangular battery 3, and the holding member 26 moves to the save position. Thus, the projection 26b formed in a united body with the engagement claw 26a more rotates in the direction of an arrow Y as compared with the case of storage of the thin rectangular battery 3. Thus, a stopper section 25, which is provided at the end of the inside of the inner panel 22, and a side wall 22a inside the inner panel 22 serve to restrict the rotation of the projection 26b both in the direction of an arrow X and the direction of an arrow Y. Therefore, the thick rectangular battery 3 is fixed by the inner panel 22 and is prevented in a vertical motion.

In this manner, thin rectangular battery is fixed by the holding member 26, which is a rigid body, and the plate spring member 24, which is an elastic body. And the thick rectangular battery is fixed by the inner panel 22 formed to meet the thickness. Thus, even if the battery storage section 10 is shocked, there are prevented a contact failure due to a gap in the battery terminals and clearance or play due to a vertical motion.

As mentioned above, according to electronic equipment of the present invention, it is possible to cope with a storage of two types of rectangular batteries mutually different in thickness with one sort of cover and without user's operation, and involving no problem of a contact failure of terminals of the rectangular battery by the impact at the time of carrying about.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An electronic equipment comprising: a battery storage section that may store two types of rectangular battery which are mutually different in thickness; and a cover that covers the battery storage section, in which the electronic equipment is operative upon receipt of an electric power from the rectangular battery stored in the battery storage section, wherein the battery storage section has a holding member movable between a holding position in which a thin rectangular battery is held and a save position in which it is permitted that a thick rectangular battery is stored in the battery storage section, and wherein the cover has a stopper section that stops the holding member at both times when the holding member is at the holding position and when the holding member is at the save position.

2. An electronic equipment according to claim 1, wherein the holding member is pivotally supported between the holding position and the save position, and has an engagement claw and a projection, the engagement claw being engaged with a side edge of the thin rectangular battery stored in the battery storage section when the holding member is at the holding position, and the projection being stopped at the stopper section on a non-rotatable basis at both times when the holding member is at the holding position and when the holding member is at the save position.

3. An electronic equipment according to claim 1, wherein an inside of the cover is provided with an elastic member to urge the rectangular battery stored in the battery storage section.

* * * * *